United States Patent [19]

Kolts et al.

[11] Patent Number: 4,937,059

[45] Date of Patent: Jun. 26, 1990

[54] ABSORPTION AND DESORPTION OF CARBON DIOXIDE

[75] Inventors: John H. Kolts, Ochelata; James B. Kimble; Donald H. Kubicek, both of Bartlesville, all of Okla.

[73] Assignee: Phillips Petroleum Company, Bartlesville, Okla.

[21] Appl. No.: 249,548

[22] Filed: Sep. 26, 1988

[51] Int. Cl.$^5$ .......................... B01D 53/34; C07C 2/84
[52] U.S. Cl. ..................................... 423/230; 585/500; 585/703; 585/904; 585/943
[58] Field of Search ................. 423/230; 585/661, 703, 585/904, 500, 700, 750, 943

[56] References Cited

U.S. PATENT DOCUMENTS

| | | | |
|---|---|---|---|
| 3,489,693 | 1/1970 | Bovard | 502/400 |
| 3,867,097 | 2/1975 | Vurek | 422/51 |
| 3,906,945 | 9/1975 | Netteland et al. | 423/230 |
| 3,974,256 | 8/1976 | Wheelock et al. | 423/230 |
| 4,002,720 | 1/1977 | Wheelock et al. | 423/230 |
| 4,005,708 | 2/1977 | Netteland et al. | 423/230 |
| 4,406,867 | 9/1983 | Marcinkowsky et al. | 423/226 |
| 4,433,981 | 2/1984 | Slaugh et al. | 55/59 |

FOREIGN PATENT DOCUMENTS

0189079A1  7/1986  European Pat. Off. .

*Primary Examiner*—Jeffrey E. Russel
*Attorney, Agent, or Firm*—K. K. Brandes

[57] ABSTRACT

A process for absorption and subsequent desorption of carbon dioxide comprises contacting a $CO_2$-containing gas with a solid sorbent comprising alkali metal oxide and/or hydroxide (preferably LiOH) and lanthanum oxide. The used solid sorbent can be regenerated by heating, so as to desorb absorbed carbon dioxide.

15 Claims, No Drawings

ABSORPTION AND DESORPTION OF CARBON DIOXIDE

BACKGROUND OF THE INVENTION

It is known that alkali metal oxides and hydroxides can absorb carbon dioxide from gas mixtures. However, there is an ever present need to develop new, improved processes which also comprise the steps of desorbing carbon dioxide from sorbents containing alkali metal oxides/hydroxides.

SUMMARY OF THE INVENTION

It is the object of this invention to provide a process for absorbing carbon dioxide from a gas mixture employing a solid sorbent, and subsequently desorbing carbon dioxide from said solid sorbent. It is another object of this invention to provide a process comprising the steps of at least partially removing carbon dioxide from a gas mixture by means of a solid sorbent in a vessel where methane is converted to higher hydrocarbons and carbon oxides; substantially desorbing carbon dioxide from said solid sorbent; and recycling the solid sorbent, from which carbon dioxide has been desorbed, to said vessel. Other objects and advantages will become apparent from the detailed description and the apprended claims.

In accordance with this invention, a process for the separation and recovery of carbon dioxide comprises the steps of (A) contacting (a) a gas feed which comprises carbon dioxide with (b) a solid sorbent comprising (preferably consisting essentially of) (i) at least one material selected from the group consisting of alkali metal oxides and alkali metal hydroxides and (ii) lanthanum oxide, under such conditions as to obtain (c) a gas product having a lower concentration of carbon dioxide than said gas feed and (d) a solid sorbent containing absorbed carbon dioxide (which has been removed from the feed and may be present as alkali metal carbonate or bicarbonate);

(B) substantially separating said solid sorbent (d) from said gas product (c); and (C) heating said solid sorbent (d) which has been separated in step (B) under such conditions as to substantially desorb carbon dioxide from said solid sorbent (d), and to obtain a regenerated solid sorbent which is substantially free of absorbed carbon dioxide (and free of alkali metal carbonate or bicarbonate).

Also in accordance with this invention, step (A) of the $CO_2$ separation/recovery process of this invention is carried out in a vessel where methane is contacted with free oxygen and is at least partially converted to a reaction mixture comprising ethane, ethylene, and carbon dioxide, wherein said sorbent acts as catalyst for this methane conversion reaction.

Furthermore, the $CO_2$ separation recovery process of this invention preferably comprises the additional step of (D) re-using at least a portion of said solid sorbent being substantially free of absorbed carbon dioxide, obtained in step (C), in the contacting zone of step (A).

DETAILED DESCRIPTION OF THE INVENTION

The solid sorbent of this invention comprises lanthanum oxide ($La_2O_3$) and at least one alkali metal hydroxide and/or oxide, preferably alkali metal hydroxide, more preferably lithium hydroxide. The sorbent material can be prepared by any suitable means. For instance, lanthanum oxide can be impregnated with a solution (preferably aqueous) of a suitable alkali metal compound (e.g., acetate, nitrate), followed by drying and calcining at a temperature high enough to decompose the alkali metal compound to oxide and/or hydroxide (preferably hydroxide).

Or, presently preferred, a suitable alkali metal compound, such as $Li_2CO_3$, can be mixed with $La_2O_3$, preferably in the presence of water, so as to obtain a thick slurry. The slurry can be dried (preferably in air, at about 90° C. to about 160° C. for about 30 minutes to about 15 hours). The dried material can then be calcined (more preferably in air, at about 300° C. to about 800° C. for about 30 minutes to about 15 hours) so as to substantially decompose the alkali metal compound to at least one of alkali metal hydroxide and alkali metal oxide, (preferably LiOH).

Generally the level of alkali metal (preferably Li; present as oxide and/or hydroxide) in the solid sorbent material of this invention is in the range of about 0.1 to about 50 weight-%, preferably about 0.5 to about 15 weight-%, more preferably about 1-5 weight-%, expressed as metal (preferably Li).

The sorbent material of this invention can be ground and sieved, and any suitable size fraction (preferably at 10-50 mesh fraction) can be used in the process of this invention.

Any suitable gas mixture can be used in step (A) of this invention. Generally the volume percentage of $CO_2$ is the feed gas mixture is in the range of about 0.1 to about 90 volume-% (preferably about 0.5-50 volume-%). Other gas components which do not significantly interfere with the sorption/desorption process of this invention can be present in the feed gas. Examples of additional gas components in the gas mixture are CO, $CH_4$, $C_2H_4$, $C_2H_6$, $C_3H_6$, $C_3H_8$, $O_2$, $N_2$ and the like.

A particular suitable gas mixture is one which is obtained after a mixture of methane and oxygen gas (or air) has been contacted with the sorbent under such conditions (preferably at 500°-1000° C., and about 14 to about 100 psia) so as to at least partially convert methane to ethane, ethylene, $C_3$ hydrocarbons, and undesirable carbon oxides ($CO_2$ and CO), as has been described in Example III.

Any suitable, effective conditions can be employed in step (A) of this invention. Generally, the temperature is about 600° to about 1,000° C. (preferably about 650°-800° C.), the pressure is about 1 to about 1,000 psia (preferably about 14-100 psia), and the time of contact between gas mixture and sorbent is about 1 second to about 100 hours (preferably about 0.02-200 minutes).

The absorption process step (A) can be carried out in any suitable apparatus, preferably in a vessel containing the sorbent as a fixed bed. The gas mixture is passed through the fixed sorbent bed (upward or downward), preferably at a gas hourly space velocity of about 0.6-6,000 cc/cc sorbent/hour. Other suitable absorption vessels are those which contain a fluidized bed of the solid sorbent particles.

Separation step (B) of this invention can be carried out in any suitable manner. In the simplest case, the flow of the gas mixture used in step (A) is discontinued, and another gas which contains substantially no $CO_2$ is passed over the solid sorbent; or, alternatively, the gas mixture is removed (by means of a pump) from the sorption vessel used in step (A).

Desorption step (C) of the process of this invention can be carried out in any suitable manner and in any suitable apparatus, preferably the same apparatus as the one used in step (A). Suitable desorption conditions of step (C) comprise a temperature in the range of from about 700° to about 1,200° C., preferably about 800°–900° C.; a pressure in the range of from about 0.1 to about 20 psia, preferably about 0.5 to about 15 psia. The duration of desorption step (C) generally depends on temperature/pressure conditions, the amount of $CO_2$ loading on the sorbent, the desired rate of $CO_2$ desorption, and the desired extent of $CO_2$ desorption/recovery from the solid sorbent. Generally, the desorption time in step (C) is in the range of from about 0.1 to about 10 hours.

It is within the scope of this invention to use a swing absorption/desorption setup, wherein the sorbent absorbs $CO_2$ from a gas mixture in a first vessel, whereas another sample of the sorbent which contains absorbed $CO_2$ is desorbed in a second, parallel vessel. When the sorbent in the first vessel is spent (i.e., has reached its $CO_2$ absorption capacity), valves located in gas conduits in front and behind the two vessels are manipulated such that $CO_2$ is desorbed from the spent sorbent in the first vessel and $CO_2$ is absorbed by the sorbent in the second vessel. In a particularly preferred embodiment of this invention, the solid sorbent material of this invention is also active as a catalyst for the oxidative conversion of methane and oxygen to $C_2$ and $C_3$ hydrocarbons.

The following examples are presented to further illustrate this invention, and are not to be construed as unduly limiting the scope of this invention.

EXAMPLE I

This example describes $CO_2$ absorption/desorption tests using various lithium-containing materials.

Material A (Control) was magnesium oxide which contained 3.9 weight-% Li (present primarily in the form of lithium hydroxide as has been determined by X-ray diffraction measurements). Material A was prepared by slurrying 100 grams of $Mg(OH)_2$ and 16 grams of $Li_2CO_3$ in enough water to form a thick slurry. The slurry was dried at 120° C., calcined for about 16 hours at 300° C., and calcined in air for four hours of 800° C.

Material B (Control) was zinc oxide which contained about 3.0 weight-% Li (present as lithium hydroxide and/or oxide). Material B was prepared substantially in the same manner as Material A except that ZnO (100 g) was used in lieu of $Mg(OH)_2$.

Material C (Invention) was lanthanum oxide ($La_2O_3$), which contained 3.3 weight-% Li (present as Li hydroxide and/or oxide), Material C was prepared substantially in the same matter as Material A except that $La_2O_3$ (100 g) was used in lieu of $Mg(OH)_2$, and the calcining temperature was 775° C.

Material C' (Invention) contained 2.5 weight-% Li on $La_2O_3$, and was prepared in accordance with the procedure for Material A except that 50 g $La_2O_3$ and 24.8 g $LiNO_3$ were used (in lieu of MgO and $Li_2CO_3$). This material was dried for three hours at 300° C. and calcined in air for four hours at 750° C.

In order to test the capacity of the above mixtures for $CO_2$ absorption, a 5 g sample of each material (20/40 mesh) was placed into a quartz tube (diameter: 7 mm). A gas mixture comprising 9 volume-% $CO_2$ and 91 volume-% $N_2$ was passed through the absorption tube at about 700° C. The total amount of absorbed $CO_2$ at the time of $CO_2$ breakthrough was determined from the flow rate of the entering feed gas (containing 9 volume-% $CO_2$), the flow rate of the exiting gas and its $CO_2$ content (determined gas chromatographically) and the total time of the absorption test (until $CO_2$ breakthrough). Test results are listed in Table I.

TABLE I

| Sorbent Material | Sample Weight (g) | Wt % Li in Sorbent | Max. cc $CO_2$ Absorbed | Max. cc $CO_2$ Absorbed per Gram Sorbent |
|---|---|---|---|---|
| A (Control) | 6.42 | 3.9 | 308 | 48 |
| B (Control) | 4.85 | | Traces | — |
| C (Invention) | 5.28 | 3.3 | 444 | 84 |

Test results in Table I show that $Li/La_2O_3$ (Material C) had a considerably higher absorption capacity (maximum volume of $CO_2$ absorbed per gram sorbent at $CO_2$ breakthrough) than the other two tested materials.

EXAMPLE II

In another series of tests, the desorbability of $CO_2$, absorbed by the above-described materials, was investigated. A gas mixture comprising about 4 volume-% $CO_2$ (the remainder being primarily nitrogen) was passed through a thermal gravimetric analyzer (TGA) comprising a Cahn/Ventron R-100 microbalance, which was loaded with a 200 mg sample of one of the above-described materials. The TGA apparatus was interfaced with a Digital Equipment Corporation MINC-11 computer and a Hewlett-Packard 7225A plotter.

First, the $CO_2$ containing gas mixture passed through the TGA apparatus (flow rate of $CO_2$: 30 cc/minute) at about 675° C. After the above-described materials had reached their maximum $CO_2$ absorption capacities at 675° C., the flow of the $CO_2$-containing food gas was stopped. When no feed gas flowed through the TGA apparatus, the weights of Material A ($Li/MgO$) and of Material B ($Li/ZnO$) remained essentially the same at 675° C. (thus indicating essentially no $CO_2$ desorption), whereas Material C' ($Li/La_2O_3$) lost about one third of its weight at 675° C., during a period of about 1 hour (indicating substantial $CO_2$ desorption at this temperature).

Thereafter, the temperature was gradually raised to about 900° C. during a period of about 1 hour. During this heating cycle (to 900° C.), Material A lost a portion of absorbed $CO_2$, Material B hardly lost any weight (because it contained only trace amounts of $CO_2$), while Material C' ($Li/La_2O_3$) rapidly lost the remainder of absorbed $CO_2$. The rate of $CO_2$ desorption for Material C' was highest at about 800°–850° C.

EXAMPLE III

This example illustrates the function of $Li/La_2O_3$ (Material C) as both $CO_2$ sorbent and catalyst in the oxidative conversion of methane to ethane, ethylene carbon dioxide etc., and the subsequent regeneration of the $Li/La_2O_3$ material by desorption of $CO_2$. 19 grams (20 cc) of 20–40 mesh Material C was loaded into a quartz reactor (having an inner diameter of 15 mm; containing a thermocouple well). The reactor was heated to the desired reaction temperature under air.

Thereafter, methane and air flow was begun (170 cc/minute CH₄ and 70 cc/minute air, at S.T.P. conditions). The gas inlet system included electronic flow measurement equipment, a three-zone furnace for heating reactant gases and solid contact material (i.e., Material C), and a downstream analysis system. The reactor effluent was snap-sampled, at any desired time interval, and analyzed for $C_1$–$C_4$ paraffins and olefins, $N_2$, $O_2$, CO and $CO_2$, by gas chromatography.

Thereafter, the flow of methane and air was discontinued, and Material C was heated to about 840° C. under nitrogen for about 3 hours. 1.5 g $CO_2$ was desorbed from Material C during this regeneration period. Then the temperature of the reactor was lowered to 729° C., the nitrogen flow was discontinued, and the flow of methane and air, as described for Run 1, was restarted.

Test results for both runs, using fresh and regenerated Material C, respectively, are summarized in Table II.

TABLE II

| Run No. | Contact Material | Sample Time (min) | Temp (°C.) | % Methane Conversion | % Selectivity[1] | | | | | | |
|---|---|---|---|---|---|---|---|---|---|---|---|
| | | | | | $C_2H_4$ | $C_2H_6$— | $C_2$'s | $C_3H_6$ | $C_3H_8$ | $CO_2$ | CO |
| 1 | Li(3%)/La₂O₃ Fresh | 5 | 702 | 17.9 | 50 | 34.5 | 84.5 | 5.5 | 3 | 5.7 | 0 |
| | | 40 | 704 | 18.1 | 51.7 | 34.4 | 85.1 | 5.6 | 2.9 | 3.7 | 0 |
| | | 90 | 704 | 17.2 | 52.6 | 34.2 | 86.8 | 5.7 | 2.5 | 5 | 0 |
| | | 130 | 712 | 16.7 | 51.6 | 29.6 | 81.2 | 5.4 | 2 | 8.1 | 2.1 |
| | | 172 | 709 | 20.5 | 38.9 | 22.4 | 61.3 | 3.9 | 1.4 | 29.4 | 3.9 |
| | | 275 | 709 | 20.5 | 38.9 | 22.5 | 61.4 | 0 | 0 | 34.6 | 3.9 |
| 2 | Li(3%)/La₂O₃ Regenerated | 5 | 729 | 17.7 | 52.0 | 29.5 | 81.5 | 5.9 | 2.4 | 8.7 | 0 |

[1]volume % of a particular component in the product, divided by % methane conversion, times 100.

Test data in Table II show that, during the first two hours, the concentration of $CO_2$ in the product gas was rather low (selectivity to $CO_2$ was about 4–8%), thus making the reaction highly selective to desirable $C_2$ hydrocarbons during the first 2 hours. After about 3 hours, the $CO_2$ concentration increased dramatically (to about 29–35% selectivity), consequently resulting in much lower selectivity to $C_2$'s. Apparently, Material C had reached its $CO_2$ absorption capacity after about 2–3 hours. Test results of Run 1 also indicate that some carbon monoxide was absorbed by Material C, in particular during the first two hours. After regeneration of Material C, the gas product again contained little $CO_2$ and the desirable $C_2$ hydrocarbons were produced at high selectivity. This result indicates that substantial amounts of produced $CO_2$ were again absorbed by the regenerated Material C.

Reasonable variations, modifications and adaptations for various usages and conditions can be made within the scope of this disclosure and the appended claims, without departing from the scope of this invention.

That which is claimed is:

1. A process for the separation and recovery of carbon dioxide comprising the steps of:
   (A) contacting (a) a gas mixture which comprises carbon dioxide with (b) a solid sorbent comprising (i) at least one compound selected from the group consisting of alkali metal oxides and alkali metal hydroxides and (ii) lanthanum oxide, under such conditions as to obtain (c) a gas product having a lower concentration of carbon dioxide than said gas mixture and (d) a solid sorbent containing absorbed carbon dioxide which has been removed from said gas mixture;
   (B) substantially separating said solid sorbent (d) from said gas product (c), so as to obtain a separated solid sorbent (d); and
   (C) heating said separated solid sorbent (d) under such conditions as to substantially desorb carbon dioxide contained in said solid sorbent (d) so as to obtain a regenerated solid sorbent.

2. A process in accordance with claim 1, wherein said alkali metal is present in said solid sorbent (a) at a level of from about 0.1 to about 50 weight-% alkali metal.

3. A process in accordance with claim 1, wherein said at least one alkali metal is lithium.

4. A process in accordance with claim 3, wherein lithium is present as lithium hydroxide.

5. A process in accordance with claim 3, wherein lithium is present in said solid sorbent at a level of about 0.5 to about 15 weight-% Li.

6. A process in accordance with claim 5 wherein said level is about 1 to about 5 weight-% Li.

7. A process in accordance with claim 1, wherein step (A) is carried out at a temperature of about 600° to about 1,000° C. and a pressure of about 1 to about 1,000 psia.

8. A process in accordance with claim 1, wherein step (A) is carried out at a temperature of about 650° to about 800° C. and a pressure of about 14 to about 100 psia.

9. A process in accordance with claim 1, wherein said gas mixture used in step (A) contains about 0.1 to about 90 volume-% $CO_2$.

10. A process in accordance with claim 1, wherein step (C) is carried out at a temperature of about 700° to about 1200° C. and at a pressure of about 0.1 to about 20 psia, for about 0.1 to about 10 hours.

11. A process in accordance with claim 10, wherein said temperature is about 800°–900° C. and said pressure is about 0.5–15 psia.

12. A process in accordance with claim 1, wherein desorbed carbon dioxide is removed from the separation zone of step (C).

13. A process in accordance with claim 1 comprising the additional step of
   (D) re-using at least a portion of said regenerated solid sorbent, from which carbon dioxide has been substantially desorbed in step (C), in the contacting zone of step (A).

14. A process in accordance with claim 1, wherein step (A) is carried out in a vessel in which methane is contacted with molecular oxygen and is at least partially converted to a reaction mixture comprising ethane, ethylene and carbon dioxide.

15. A process in accordance with claim 14 comprising the additional step of:
   (D) re-using at least a portion of said solid regenerated sorbent, from which carbon dioxide has been substantially desorbed in step (C), in the contacting zone of step (A).

* * * * *